(12) United States Patent
Li et al.

(10) Patent No.: US 12,470,978 B2
(45) Date of Patent: Nov. 11, 2025

(54) METHOD FOR DETERMINING CONTENTION WINDOW, ACCESS POINT AND STATION

(71) Applicant: TP-LINK CORPORATION LIMITED, Hong Kong (CN)

(72) Inventors: Wanyi Li, Shenzhen (CN); Changqiang Wu, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 373 days.

(21) Appl. No.: 17/964,956

(22) Filed: Oct. 13, 2022

(65) Prior Publication Data

US 2024/0129792 A1      Apr. 18, 2024

(30) Foreign Application Priority Data

Oct. 14, 2021  (CN) .......................... 202111199593.5

(51) Int. Cl.
*H04W 28/02*  (2009.01)
*H04W 72/53*  (2023.01)
*H04W 74/08*  (2009.01)

(52) U.S. Cl.
CPC ....... *H04W 28/0278* (2013.01); *H04W 72/53* (2023.01); *H04W 74/08* (2013.01)

(58) Field of Classification Search
None
See application file for complete search history.

(56) References Cited

U.S. PATENT DOCUMENTS

| 11,750,435 B2 * | 9/2023 | Yu .......................... H04L 1/0003 |
| 2018/0302923 A1 * | 10/2018 | Patil .................. H04W 74/0833 |
| 2019/0191461 A1 * | 6/2019 | Lee ........................ H04W 72/12 |

(Continued)

FOREIGN PATENT DOCUMENTS

| CN | 103442392 A | * 8/2013 |
| CN | 103442392 B | 3/2016 |
| GB | 2549739 A | * 11/2017 |

OTHER PUBLICATIONS

Performance Analysis of IEEE 802.11E under Binomial Backoff Algorithm (Year: 2014).*

(Continued)

*Primary Examiner* — Chirag G Shah
*Assistant Examiner* — Benjamin Peter Welte
(74) *Attorney, Agent, or Firm* — Loeb & Loeb LLP

(57) ABSTRACT

The present disclosure provides a method for determining a contention window, an access point, and a station. The method for determining the contention window is performed at an access point and includes: acquiring buffer status reports of one or more stations and resource unit allocation status of the access point; and determining contention window parameters of the contention window according to the buffer status reports and the resource unit allocation status, wherein the contention window parameters include a maximum contention window value, a minimum contention window value and a reserved field value, and the reserved field value is for indicating whether stations associated and not associated with the access point select the maximum contention window value or the minimum contention window value of the contention window as a corresponding contention window value.

15 Claims, 3 Drawing Sheets

Acquiring buffer status reports of one or more stations and a resource unit allocation status of an access point — S11

Determining contention window parameters of the contention window according to the buffer status report and the resource unit allocation status, wherein the contention window parameters comprise a maximum contention window value, a minimum contention window value and a reserved field value, and the reserved field value is for indicating whether stations associated and not associated with the access point select the maximum contention window value or the minimum contention window value of the contention window as a corresponding contention window value — S12

(56) References Cited

U.S. PATENT DOCUMENTS

2019/0274171 A1\* 9/2019 Viger ................ H04W 74/0833
2020/0396766 A1\* 12/2020 Xue .................. H04W 74/0808
2024/0406982 A1\* 12/2024 Ganesan ........... H04W 74/0808

OTHER PUBLICATIONS

Performance Analysis for Uniform and Binomial Distribution on Contention Window using Different Hop Distance (Year: 2015).\*

\* cited by examiner

METHOD FOR DETERMINING CONTENTION WINDOW, ACCESS POINT AND STATION

TECHNICAL FIELD

The present disclosure relates to a field of wireless communication, and in particular, to a method for determining a contention window, an access point and a station.

BACKGROUND

IEEE Std 802.11ax defines a Resource Unit (RU) allocation and Multi-User (MU) access mechanism based on Trigger Frame (TF) and Trigger Frame for Random access (TF-R), and uses an OFDMA communication system to improve network performance in dense Multi-User scenarios.

SUMMARY

The purpose of the present disclosure is to provide a method for determining a contention window and an access point, as well as a method for contending for access to resource units and a station, which can effectively improve the reasonability of resource allocation and reduce the possibility of resource unit access conflicts of stations.

According to a first aspect of the present disclosure, there is provided a method for determining a contention window, which is performed at an access point and comprises:

acquiring buffer status reports of one or more stations and resource unit allocation status of the access point; and determining contention window parameters of the contention window according to the buffer status reports and the resource unit allocation status, wherein the contention window parameters comprise a maximum contention window value, a minimum contention window value, and a reserved field value, and the reserved field value is for indicating whether stations associated and not associated with the access point select the maximum contention window value or the minimum contention window value of the contention window as a corresponding contention window value.

According to a preferred embodiment of the present disclosure, acquiring the buffer status reports of one or more stations comprises acquiring, through a buffer status report (BSR) mechanism, the buffer status reports of one or more stations that have been associated with the access point and are in an active status, and the buffer status reports of each station indicate whether the station has a buffered data transmission demand.

According to a preferred embodiment of the present disclosure, determining the contention window parameters of the contention window according to the buffer status reports and the resource unit allocation status further comprises:

based on predetermined rules, allocating resource units to stations that have buffered data transmission demands;

determining whether there are remaining resource units of the access point in a case where the access point has determined that it allocates resource units to all the stations that have buffered data transmission demands;

if there are remaining resource units, setting the minimum contention window value of the contention window to a lower limit value required by a communication protocol, setting the maximum contention window value of the contention window to an upper limit value required by the communication protocol, and setting the reserved field value of the contention window to a fourth value, wherein the fourth value is for indicating that an associated station selects the maximum contention window value and an unassociated station selects the minimum contention window value;

if there are no remaining resource units, setting the minimum contention window value of the contention window to the lower limit value required by the communication protocol, and setting the reserved field value of the contention window to a first value, wherein the first value is for indicating that all stations select the minimum contention window value.

According to a preferred embodiment of the present disclosure, determining the contention window parameters of the contention window according to the buffer status reports and the resource unit allocation status further comprises:

based on predetermined rules, allocating resource units to stations that have buffered data transmission demands;

determining whether there are remaining resource units of the access point in a case where the access point determines not to allocate the resource units to all the stations that have buffered data transmission demands;

if there are remaining resource units, setting the minimum contention window value of the contention window to a specified window value, setting the maximum contention window value of the contention window to an upper limit required by a communication protocol, and setting the reserved field of the contention window to a third value, wherein the third value is for indicating that an associated station selects the minimum contention window value and an unassociated station selects the maximum contention window value;

if there are no remaining resource units, setting the maximum contention window value of the contention window to an upper limit value required by the communication protocol, and setting the reserved field value of the contention window to a second value, wherein the second value is for indicating that all stations select the maximum contention window value.

According to a preferred embodiment of the present disclosure, the specified window value is calculated from the number of stations that have been associated but have not been allocated resource units and the number of the remaining resource units.

According to a preferred embodiment of the present disclosure, calculating the specified window value from the number of the stations that have been associated but have not been allocated resource units and the number of the remaining resource units comprises: calculating the specified window value by using a binomial distribution probability model based on a preset expected probability that no resource contention occurs, wherein the binomial distribution probability model is:

$$p = C(x,y) * p_1^{y} * (1-p_1)^{(x-y)}$$

wherein p represents the expected probability, x represents the number of the stations that have been associated but have not been allocated resource units, y represents the number of the remaining resource units, C(x,y) represents combinatorial number for taking y elements from x different elements, $$p_1 = \frac{y}{OCW_{shcd}},$$

and $OCW_{shcd}$ represents the specified window value.

According to a second aspect of the present disclosure, there is provided an access point, comprising:

a memory, and a processor communicatively coupled with the memory and configured to:

acquire buffer status reports of one or more stations and resource unit allocation status of the access point; and determine contention window parameters of the contention window according to the buffer status reports and the resource unit allocation status, wherein the contention window parameters comprise a maximum contention window value, a minimum contention window value, and a reserved field value, and the reserved field value is for indicating whether stations associated and not associated with the access point select the maximum contention window value or the minimum contention window value of the contention window as a corresponding contention window value.

According to a preferred embodiment of the present disclosure, acquiring the buffer status reports of one or more stations comprises acquiring, through the BSR mechanism, the buffer status reports of one or more stations that have been associated with the access point and are in an active status, and the buffer status reports of each station indicate whether the station has a buffered data transmission demand.

According to a preferred embodiment of the present disclosure, determining the contention window parameters of the contention window according to the buffer status reports and the resource unit allocation status further comprises:

based on predetermined rules, allocating resource units to stations that have buffered data transmission demands;

determining whether there are remaining resource units of the access point in a case where the access point has determined that it allocates resource units to all the stations that have buffered data transmission demands;

if there are remaining resource units, setting the minimum contention window value of the contention window to a lower limit value required by a communication protocol, setting the maximum contention window value of the contention window to an upper limit value required by the communication protocol, and setting the reserved field value of the contention window to a fourth value, wherein the fourth value is for indicating that an associated station selects the maximum contention window value and an unassociated station selects the minimum contention window value;

if there are no remaining resource units, setting the minimum contention window value of the contention window to the lower limit value required by the communication protocol, and setting the reserved field value of the contention window to a first value, wherein the first value is for indicating that all stations select the minimum contention window value.

According to a preferred embodiment of the present disclosure, determining the contention window parameters of the contention window according to the buffer status reports and the resource unit allocation status further comprises:

based on predetermined rules, allocating resource units to stations that have buffered data transmission demands;

determining whether there are remaining resource units of the access point in a case where the access point has determined that it does not allocate the resource units to all the stations that have buffered data transmission demands;

if there are remaining resource units, setting the minimum contention window value of the contention window to a specified window value, setting the maximum contention window value of the contention window to an upper limit required by a communication protocol, and setting the reserved field of the contention window to a third value, wherein the third value is for indicating that an associated station selects the minimum contention window value and an unassociated station selects the maximum contention window value;

if there are no remaining resource units, setting the maximum contention window value of the contention window to an upper limit value required by the communication protocol, and setting the reserved field value of the contention window to a second value, wherein the second value is for indicating that all stations select the maximum contention window value.

According to a preferred embodiment of the present disclosure, the specified window value is calculated from the number of stations that have been associated but have not been allocated resource units and the number of the remaining resource units.

According to a preferred embodiment of the present disclosure, calculating the specified window value from the number of the stations that have been associated but have not been allocated resource units and the number of the remaining resource units comprises:

calculating the specified window value by using a binomial distribution probability model based on a preset expected probability that no resource contention occurs, wherein the binomial distribution probability model is:

$$p=C(x,y)*p_1^{y}*(1-p_1)^{(x-y)}$$

wherein p represents the expected probability, x represents the number of the stations that have been associated but have not been allocated resource units, y represents the number of the remaining resource units, $C(x,y)$ represents combinatorial number for taking y elements from $\underline{x}$ different elements, $$p_1 = \frac{y}{OCW_{shcd}},$$

and $OCW_{shcd}$ represents the specified window value.

According to a third aspect of the present disclosure, there is provided a station, comprising:

a memory, and a processor communicatively coupled to the memory and configured to:

receive, from an access point, a management frame comprising contention window parameters determined by the access point, wherein the contention window parameters comprise a maximum contention window value, a minimum contention window value, and a reserved field value, and the reserved field value is for indicating whether stations associated and not associated with the access point select the maximum contention window value or the minimum contention window value of the contention window as a corresponding contention window value; and select the maximum contention window value or the minimum contention window value as the contention window value according to an association status of the station with the access point and the reserved field value.

According to a preferred embodiment of the present disclosure, in a case where the station has not been associated with the access point:

if the reserved field value is a first value or a fourth value, select the minimum contention window value; and if the reserved field value is a second value or a third value, select the maximum contention window value.

According to a preferred embodiment of the present disclosure, in a case where the station has been associated with the access point:

if the reserved field value is a first value or a third value, select the minimum contention window value; and if the reserved field value is a second value or a fourth value, select the maximum contention window value.

BRIEF DESCRIPTION OF THE DRAWINGS

In order to illustrate the technical solutions of the present disclosure more clearly, drawings used in the implementations will be briefly introduced as follows. Obviously, the drawings in the following descriptions are only some implementations, and for those of ordinary skill in the art, other drawings can also be obtained based on these drawings without creative efforts.

DETAILED DESCRIPTION

Technical solutions in embodiments of the present disclosure will be clearly and completely described below with reference to the drawings in the embodiments of the present disclosure. Obviously, the embodiments to be described are only a part, but not all, of the embodiments of the present disclosure. Based on the embodiments of the present disclosure, all other embodiments obtained by those of ordinary skill in the art without creative efforts should fall within the protection scope of the present disclosure.

In an MU access mechanism, the IEEE Std 802.11ax protocol specifies a UL OFDMA-based random access (UORA) mechanism, which provides a way for users to randomly contend for and access to RUs. In this mechanism, an HE AP can carry a UORA Parameter Set element in a management frame to be transmitted; the access point (AP) needs to indicate the range of an OFDMA Contention Window (OCW) in the UORA Parameter Set element transmitted to a non-Access Point station (non-AP STA) for random access of the station (STA) to random access resource units (RA-RUs) after the Trigger frame. One non-AP STA needs to maintain an internal Contention Window Value (OCW) and an internal OBO counter, where the OCW is an integer value in the range [OCWmin, OCWmax]. Currently, OCWmin and OCWmax are usually defined by dot11OCWmin and dot11OCWmax. One non-AP STA needs to be updated according to a received UORA Parameter Set element carried by Beacon or Probe Response/(Re) Association Response. Each time a non-AP STA is associated with an AP, it needs to initialize its own OBO counter to a value in the range [0, OCW]. The OBO value is a positive number maintained locally at a station. When a station wants to participate in contention for the random access resource units, the OBO counter of the station should count down the OBO number according to the protocol specification; when the OBO number counts down to 0, the station can participate in the contention for the random access resource units; otherwise, it cannot access to the random access resource units. All stations initialize their own OBO counters according to the value of the OCW. Thus, it is likely to cause improper resource allocation for stations with different transmission demands, and at the same time, it is likely to increase the possibility of conflicts of RU access.

Figure 1:
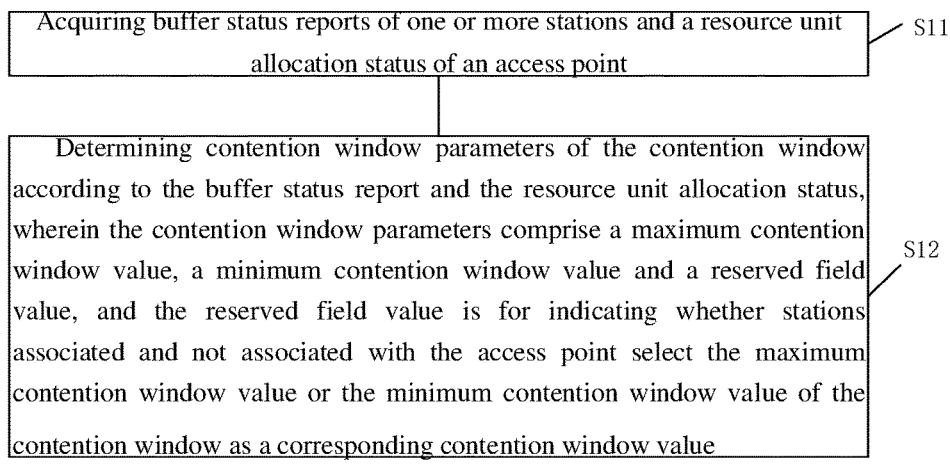
FIG. 1 is a flowchart of a method for determining a contention window according to an embodiment of the present disclosure.

Referring to FIG. 1, the present disclosure provides a method for determining a contention window, which can be performed at an access point. At S11, buffer status reports of one or more stations and resource unit allocation status of an access point may be acquired; at S12, contention window parameters of a contention window can be determined according to the buffer status reports and the resource unit allocation status.

The buffer status reports may be information that is transmitted from each station to the access point and describes the corresponding buffer status of the station. According to the received buffer status reports, the access point can determine whether each station has buffered data transmission demand. Specifically, the buffer status reports of a station may include the length of the buffered data queue of the station, to indicate whether the station has buffered data transmission demand. For example, in a case where the length of the queue exceeds a length threshold, the buffer status reports of the station indicate that the station has buffered data transmission demand. As a non-limiting example, the buffer status reports may be obtained through a buffer status report (BSR) mechanism. The process of the BSR mechanism may be divided into two cases: passive and active. Case 1: an access point transmits to a station a trigger frame with a BSR request, and after receiving the trigger frame, the station reports information such as the size of its local buffered traffic(s) and the service type of the traffic(s); Case 2: when an access point does not transmit the BSR trigger frame to a station, the station actively reports its own buffer status.

In an embodiment according to the present disclosure, acquiring the buffer status reports of one or more stations at S11 may comprise acquiring, through the BSR mechanism, the buffer status reports of the one or more stations that have been associated with the access point and are in an active status, where the buffer status reports may indicate whether the station has buffered data transmission demand. In this way, it may be helpful for the access point to more accurately determine the communication demands of the associated STAs so as to perform subsequent RU allocation.

The resource unit allocation status of the access point may include information indicating whether each resource unit of the access point is idle (that is, indicating whether the resource unit has been allocated to a certain station), information indicating which station the resource unit is specifically allocated to, and so on. According to its resource unit allocation status, the access point can determine whether it has determined to allocate resource units for all the stations that have buffered data transmission demands, whether it has remaining resource units, and so on.

Figure 2:
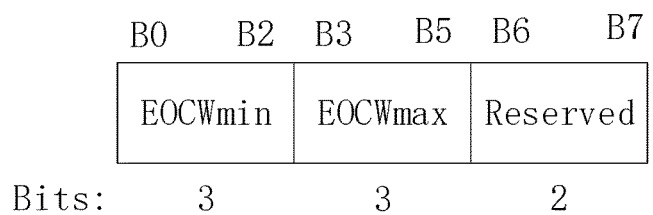
FIG. 2 is a schematic diagram of a contention window according to an embodiment of the present disclosure.

A contention window is fields transmitted from an access point to a station associated with resource contention. FIG. 2 shows a schematic diagram of a contention window according to an embodiment of the present disclosure. As shown in FIG. 2, the contention window of the access point may include an EOCWmin field, an EOCWmax field, and a Reserved field. The value of the EOCWmin field is a minimum contention window value, the value of the EOCWmax field is a maximum contention window value, and the value of the Reserved field is a reserved field value for indicating whether stations associated and not associated with the access point select the maximum contention window value or the minimum contention window value as a corresponding contention window value. The embodiment shown in FIG. 2 expands and supplements the existing contention window parameters OCWmin and OCWmax. On the basis of the minimum contention window value EOCWmin and the maximum contention window value EOCWmax, the reserved field Reserved is added, and its value indicates a relevant station selects the maximum contention window value or the minimum contention window value from the corresponding contention window.

Specifically, the value of the EOCWmin field can be set to an arbitrary value that is not smaller than a lower limit value required by the communication protocol and not larger than an upper limit value required by the communication protocol. In the present disclosure, in a case where the random access resource units currently available for allocation are relatively sufficient, it is less likely that resource unit access conflict occurs, and the access point may tend to allow more stations to have the opportunity to access resource units. The value of the EOCWmin field is then set to be relatively small. In a case where the random access resource units currently available for allocation are insufficient, it is more likely that resource unit access conflict occurs, and the access point may tend to avoid contentions among stations for resource units. The value of the EOCWmin field is then set to be relatively large.

Similarly, the value of the EOCWmax field may be set to an arbitrary value that is not smaller than the value of the EOCWmin field and not larger than the upper limit value required by the communication protocol.

The value of the Reserved field can be set to indicate that stations associated and not associated with the access point select EOCWmax or EOCWmin as an OCW value for initializing their own OBO counters. As a non-limiting example, the value of the Reserved field may be a first value (e.g., 0), a second value (e.g., 1), a third value (e.g., 2), or a fourth value (e.g., 3). The reserved field value set to 0 may indicate that it is suggested that all stations select the minimum contention window value EOCWmin; the reserved field value set to 1 may indicate that it is suggested that all stations select the maximum contention window value EOCWmax; the reserved field value set to 2 may indicate that it is suggested that associated stations select the minimum contention window value EOCWmin and unassociated stations select the maximum contention window value EOCWmax; and the reserved field value set to 3 may indicate that it is suggested that an associated station selects the maximum contention window value EOCWmax and an unassociated station selects the minimum contention window value EOCWmin.

To sum up, the present disclosure provides a method for determining a contention window, including:
S11: acquiring buffer status reports of one or more stations and resource unit allocation status of an access point;
S12: determining contention window parameters of the contention window according to the buffer status reports and the resource unit allocation status;
where the contention window parameters comprise a maximum contention window value, a minimum contention window value, and a reserved field value, and the reserved field value is for indicating whether stations associated and not associated with the access point select the maximum contention window value or the minimum contention window value of the contention window as a corresponding contention window value.

The access point may allocate, based on predetermined rules, resource units to stations that have buffered data transmission demands. For example, the numbers of resource units (RUs) and random access resource units (RA-RUs) to be allocated to the associated stations and the unassociated stations are determined according to the buffer status reports uploaded by the stations. Specifically, the access point may inquire according to the number of stations that have been associated and are still in an active status in the current network, and derive the RUs to be allocated and the remaining unallocated RA-RUs (including RA-RUs provided to the associated STAs and RA-RUs provided to the unassociated STAs) according to a certain RU allocation algorithm. Then, the contention window parameters of the contention window may be determined.

First Case: determining whether there are remaining resource units of the access point in a case where the access point has determined that it allocates resource units to all the stations that have buffered data transmission demands:

If there are remaining resource units, setting the minimum contention window value EOCWmin of the contention window to the lower limit value required by the communication protocol, setting the maximum contention window value EOCWmax of the contention window to the upper limit value required by the communication protocol, and setting the reserved field value Reserved of the contention window to a fourth value, where the fourth value is for indicating that an associated station selects the maximum contention window value EOCWmax, and an unassociated station selects the minimum contention window value EOCWmin. For example, the minimum contention window value EOCWmin of the access point may be set to a lower limit value dot11OCWmin required by the IEEE 802.11 MAC layer protocol, the maximum contention window value EOCWmax may be set to an upper limit value dot11OCWmax required by the IEEE 802.11 MAC layer protocol, and the reserved field value Reserved may be set to 3. Since all the associated stations that want to transmit data have already obtained resource units, the resource units may subsequently be given to the unassociated stations as much as possible.

If there are no remaining resource units, the minimum contention window value EOCWmin of the contention window may be set to the lower limit value required by the communication protocol, and the reserved field value Reserved of the contention window may be set to a first value, where the first value is for indicating that all stations select the minimum contention window value EOCWmin. For example, the minimum contention window value EOCWmin of the access point may be set to the lower limit value dot11OCWmin required by the IEEE 802.11 MAC layer protocol, and the reserved field value Reserved may be set to 0. At this time, the demands of the stations for the current round have been met, other stations that may want to contend may set their OBO counters to a smaller value based on the OCW value (at this time, the OCW value is EOCWmin which is set to the lower limit value required by the communication protocol) so as to access to the resource units as soon as possible next time. In this case, the maximum contention window value of the contention window of the access point can be set to an arbitrary value, and as a non-limiting example, it may be set to the upper limit value dot11OCWmax required by the IEEE 802.11 MAC layer protocol, or may be set to other values that meet the protocol requirements.

Second Case: the access point determines not to allocate the resource units to all the stations that have buffered data transmission demands. As a non-limiting example, in a case where multiple stations have buffered data transmission demands, at this time, the access point may be unable to allocate resource units to all the stations that have buffered data transmission demands due to insufficient resource units, or may not allocate resources for some of the stations (such as stations with lower demand priority) due to predetermined allocation rules although the resource units are sufficient. In this case, determining whether there are remaining resource units of the access point:

If there are remaining resource units, the minimum contention window value EOCWmin of the contention window may be set to a specified window value $OCW_{shcd}$, the maximum contention window value EOCWmax of the contention window may be set to the upper limit required by the communication protocol, and the reserved field of the contention window may be set to a third value, where the third value is for indicating that an associated station selects the minimum contention window value EOCWmin and an unassociated station selects the maximum contention window value EOCWmax. For example, the minimum contention window value EOCWmin of the access point may be set to the specified window value $OCW_{shcd}$, the maximum contention window value EOCWmax may be set to the upper limit value dot11OCWmax required by the IEEE 802.11 MAC layer protocol, and the reserved field may be set to 2. It is then quite possible that the demands for resource units of the stations that have been associated but have not been allocated resource units are greater than the remaining resource units available for allocation, and the amount of data to be transmitted by these stations is not large, the priority thereof is not high. Thus, the access point does not fully meet their demands and provides some resource units for the stations to contend for. Therefore, by setting the OCW to indicate the associated stations to select $OCW_{shcd}$ and the unassociated STAs to select dot11OCWmax, the conflict between stations accessing to resource units can be avoided as much as possible.

In an embodiment according to the present disclosure, the specified window value $OCW_{shcd}$ may be calculated from the number of stations that have been associated but have not been allocated resource units and the number of remaining random access resource units.

Assuming that at this time the number of stations that have been associated but have not been allocated resource units is x, the number of remaining random access resource units available for allocation is y, and x>y; then, it is desired that only y or fewer stations are contending for resource units, to avoid conflicts as much as possible. Assuming that the minimum contention window value is to be set as $OCW_{shcd}$, and a station also sets its own OCW to $OCW_{shcd}$, then the probability that the station sets the OBO value below the value of y is $$p_1 = \frac{y}{OCW_{shcd}};$$

based on a binomial distribution probability model, the probability that exactly y stations set the OBO value below the value of y is $p=C(x,y)*p_1^{y}*(1-p_1)^{(x-y)}$. Therefore, the value of $OCW_{shcd}$ depends on the value of the expected probability p. Assuming that the expected probability p is 90%, by bringing it into the above binomial distribution probability model, the expression of $OCW_{shcd}$ with respect to x and y can be obtained, so as to obtain $OCW_{shcd}$ finally.

Therefore, the specified window value $OCW_{shcd}$ can be calculated by using the binomial distribution probability model based on a preset expected probability that no resource contention occurs. The binomial distribution probability model is:

$$p=C(x,y)*p_1^{y}*(1-p_1)^{(x-y)}$$

where p represents the expected probability, x represents the number of stations that have been associated but have not been allocated resource units, y represents the number of remaining random access resource units, C(x,y) represents combinatorial number for taking y elements from $\underline{x}$ different elements, $$p_1 = \frac{y}{OCW_{shcd}},$$

and $OCW_{shcd}$ represents the specified window value.

The calculation method of the specified window value $OCW_{shcd}$ is not limited to this, and the specified window value $OCW_{shcd}$ can be calculated by adopting other probability models based on the number of stations that have been associated but have not been allocated resource units and the number of remaining random access resource units.

In the aforementioned Second Case, if there are no remaining resource units, the maximum contention window value EOCWmax of the contention window may be set to the upper limit value required by the communication protocol, and the reserved field value Reserved of the contention window may be set to a second value, where the second value is for indicating that all stations select the maximum contention window value. For example, the maximum contention window value of the access point may be set to the upper limit value dot11OCWmax required by the IEEE 802.11 MAC layer protocol, and the reserved field may be set to 1. At this time, the demands of the stations for the current round have not been met, other stations that may want to contend may set their own OBO counters to a larger value, so as to avoid subsequent RU access conflicts. In this case, the minimum contention window value EOCWmin of the contention window of the access point may be set to an arbitrary value, and as a non-limiting example, it may be set to the lower limit value dot11OCWmin required by the IEEE 802.11 MAC layer protocol, or may be set to other values that meet the protocol requirements.

It should be understood that the above two Cases are only non-limiting examples, and the method for setting the values of the contention window in the present disclosure is not limited thereto.

Compared with the prior art, the beneficial effect of the above method according to the embodiments of the present disclosure lies in that: by determining the maximum contention window value, the minimum contention window value, and the reserved field of the contention window based on the buffer status reports of the stations acquired by the access point and the resource unit allocation status, the contention window allocation is more scientific and evidence-based, which can effectively improve the reasonability of resource allocation and reduce the possibility of the accesses conflicts to resource units of the stations.

Figure 3:
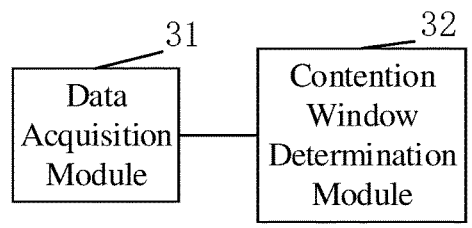
FIG. 3 is a schematic block diagram of an access point according to an embodiment of the present disclosure.

Referring to FIG. 3, the present disclosure provides an access point that includes a data acquisition module 31 and a contention window determination module 32. The data acquisition module 31 may be configured to acquire buffer status reports of one or more stations and resource unit allocation status of an access point. The contention window determination module 32 may be configured to determine the contention window parameters of a contention window based on the buffer status reports and the resource unit allocation status.

Figure 4:
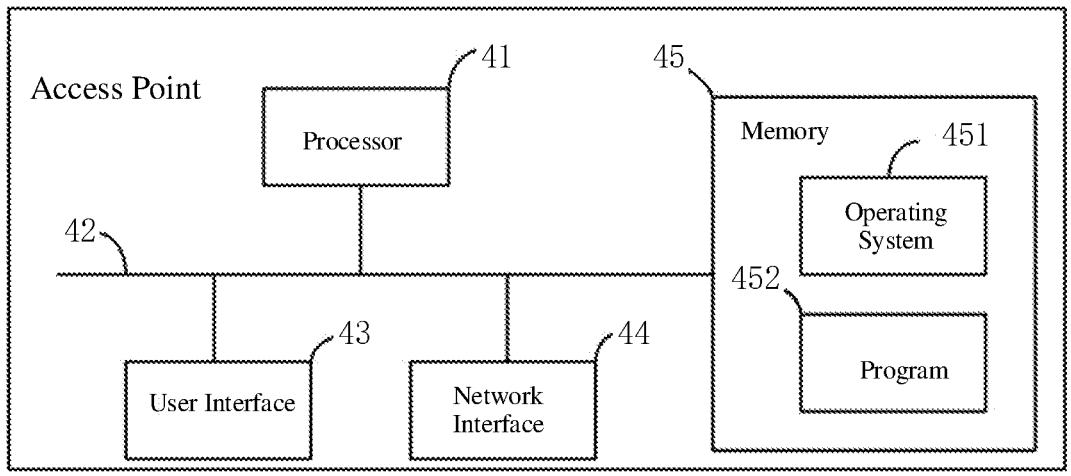
FIG. 4 is a schematic block diagram of an access point according to an embodiment of the present disclosure.

Referring to FIG. 4, the present disclosure provides an access point including at least one processor 41 (such as CPU), at least one network interface 44 or other user interfaces 43, memory 45, and at least one communication bus 42 to implement connection communication between these components. Among them, the user interface 43 may optionally include a USB interface and other standard interfaces as well as a wired interface. The network interface 44 may optionally include a Wi-Fi interface as well as other wireless interfaces. The memory 45 may include a high-speed RAM, and may also include a non-volatile memory, such as at least one disk memory. The memory 45 may optionally comprise at least one storage device located remotely from the aforementioned processor 41.

In some embodiments, memory 45 stores the following elements, executable modules or data structures, subsets thereof, or extensions thereof:
an operating system 451 including various system programs for implementing various basic services and processing hardware-based tasks;
a program 452.

Specifically, the processor 41 is configured to invoke the program 452 stored in the memory 45 to execute the above-mentioned method for determining the contention window, for example, to execute at least one of the steps S11 and S12 shown in FIG. 1. Alternatively, the processor implements, when executing the computer program, the functions of various modules/units in the various device embodiments described above, such as a data acquisition module.

Exemplarily, the computer program may be divided into one or more modules/units, which are stored in the memory and executed by the processor to accomplish the present invention. The one or more modules/units may be a series of computer program instruction segments capable of performing specific functions, and the instruction segments are used to describe the execution process of the computer program in the method for determining the contention window.

Those skilled in the art can understand that the schematic diagram is only an example of the access point device, and does not constitute a limitation on the access point device, and the access point device may include more or fewer components than those shown in the figure, or combine some components, or different components.

The processor 41 may be a Microcontroller Unit (MCU) Central Processing Unit (CPU), or may be other general-purpose processor, Digital Signal Processor (DSP), Application Specific Integrated Circuit (ASIC), Field-Programmable Gate Array (FPGA) or other programmable logic device, discrete gate or transistor logic device, discrete hardware component, etc. The general-purpose processor may be a microprocessor or the processor may be any conventional processor, etc. The processor 41 is the control center of the method for determining the contention window which connects various parts of the whole method for determining the contention window by various interfaces and lines.

The memory 45 may be used to store computer programs and/or modules, and the processor 41 implements various functions of the method for determining the contention window by running or executing the computer programs and/or modules stored in the memory and invoking data stored in the memory. The memory 45 may mainly include a storage program area and a storage data area, where the storage program area may store an operating system, applications required by at least one function (such as sound playing function, image playing function, etc.) and so on; and the storage data area may store data created according to the use of a mobile phone (such as audio data, phone book, etc.). In addition, the memory 45 may include a high-speed random-access memory, and may also include a nonvolatile memory (such as a hard disk, an internal memory, a plug-in hard disk), a Smart Media Card (SMC), a Secure Digital (SD) card, a Flash Card, at least one disk storage device, a flash device, or other volatile solid-state storage devices.

Among them, the integrated modules/units of the access point may be stored in a computer readable storage medium if they are implemented in the form of software functional units and sold or used as an independent product. Based on this understanding, the present invention can realize all or part of the processes in the methods of the above embodiments by instructing related hardware through a computer program, where the computer program may be stored in a computer readable storage medium, and when executed by a processor, the computer program may realize the steps of various method embodiments described above. The computer program includes computer program code which may be in the form of source code, object code, executable file or some intermediate form. The computer readable medium may include any entity or device capable of carrying the computer program code, recording medium, USB disk, removable hard disk, magnetic disk, optical disc, computer memory, Read-Only Memory (ROM), Random Access Memory (RAM), electrical carrier signal, telecommunication signal, software distribution medium, etc.

Figure 5:
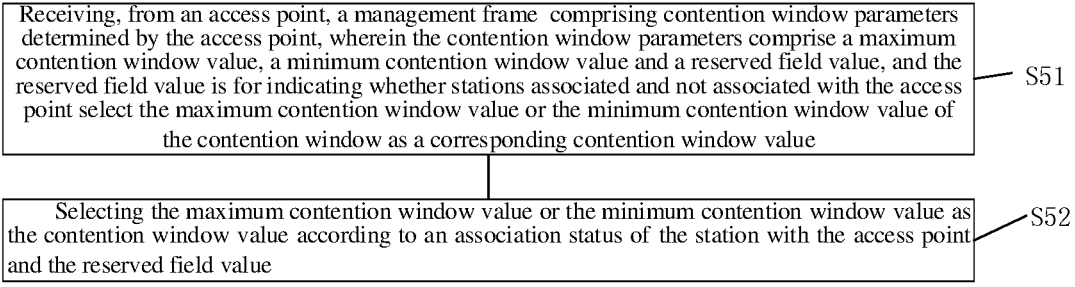
FIG. 5 is a flowchart of a method for contending for access to a resource unit according to an embodiment of the present disclosure.

Referring to FIG. 5, a flowchart of a method for contending for access to resource units which may be performed at a station is provided, where the station for example may communicate with the aforementioned access point. At S51, a management frame may be received from the access point, the management frame includes contention window parameters determined by the access point, where the contention window parameters may include a maximum contention window value EOCWmax, a minimum contention window value EOCWmin, and a reserved field value Reserved, and the reserved field value is for indicating whether stations associated and not associated with the access point select the maximum contention window value EOCWmax or the minimum contention window value EOCWmin of the contention window as a corresponding contention window value. At S52, the maximum contention window value EOCWmax or the minimum contention window value EOCWmin may be selected as the contention window value for initializing an OBO counter of the station according to an association status of the station with the access point and the reserved field value.

In the embodiments according to the present disclosure, in a case where the station has not been associated with the access point that transmits the management frame, the following determinations may be made according to the reserved field value Reserved: if the reserved field value Reserved is the first value or the second value (e.g., 0 or 1), the minimum contention window value EOCWmin is selected as the OCW value for initializing the OBO counter of the station; and if the reserved field value Reserved is the third value or the fourth value (for example, 2 or 3), the maximum contention window value EOCWmax is selected as the contention window value OCW for initializing the OBO counter of the station.

In the embodiments according to the present disclosure, in a case where the station has been associated with the access point that transmits the management frame, the following determinations may be made according to the reserved field value Reserved: if the reserved field value Reserved is the first value or the third value (e.g., 0 or 2), the minimum contention window value EOCWmin is selected as the OCW value for initializing the OBO counter of the station; and if the reserved field value Reserved is the second value or the fourth value (for example, 1 or 3), the maximum contention window value EOCWmax is selected as the contention window value OCW for initializing the OBO counter of the station.

Figure 6:
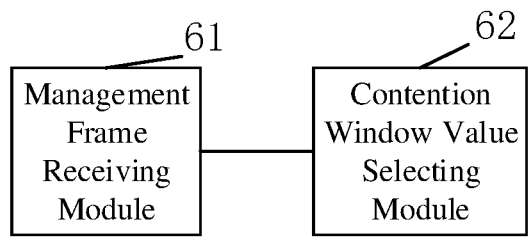
FIG. 6 is a schematic block diagram of a station according to an embodiment of the present disclosure.

Referring to FIG. 6, a schematic block diagram of a station is provided. The station may include a management frame receiving module 61 and a contention window value selecting module 62. The management frame receiving module 61 may be configured to receive a management frame from an access point. The management frame may include contention window parameters determined by the access point, where the contention window parameters include a maximum contention window value EOCWmax, a minimum contention window value EOCWmin, and a reserved field value Reserved, and the reserved field value is for indicating whether stations associated and not associated with the access point select the maximum contention window value EOCWmax or the minimum contention window value EOCWmin of the contention window as a corresponding contention window value. The contention window value selecting module 62 may be configured to select the maximum contention window value EOCWmax or the minimum contention window value EOCWmin as the contention window value OCW for initializing an OBO counter according to an association status of the station with the access point and the reserved field value Reserved.

Figure 7:
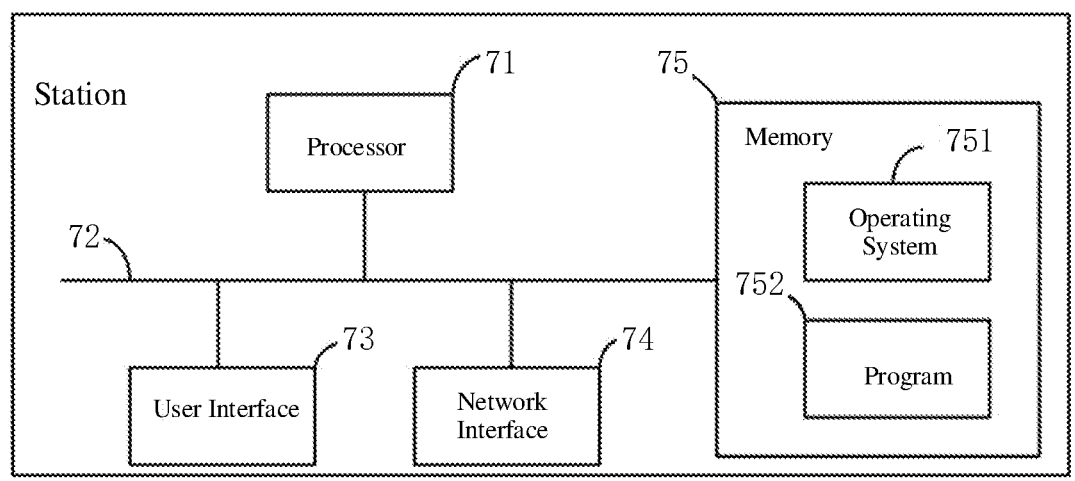
FIG. 7 is a schematic block diagram of a station according to an embodiment of the present disclosure.

Besides, referring to FIG. 7, the present disclosure provides a station including at least one processor 71 (such as CPU), at least one network interface 74 or other user interfaces 73, memory 75 and at least one communication bus 72 to implement connection communication between these components. Among them, the user interface 73 may optionally include a USB interface and other standard interfaces as well as wired interface. The network interface 74 may optionally include a Wi-Fi interface as well as other wireless interfaces. The memory 75 may include a high-speed RAM memory, and may also include a non-volatile memory, such as at least one disk memory. The memory 75 may optionally comprise at least one storage device located remotely from the aforementioned processor 71.

In some embodiments, memory 75 stores the following elements, executable modules or data structures, or subsets thereof, or extensions thereof:
an operating system 751 including various system programs for implementing various basic services and processing hardware-based tasks;
a program 752.

Specifically, the processor 71 is configured to invoke the program 752 stored in the memory 75 to execute the above-mentioned method for determining the contention window, for example, to execute at least one of the steps S51 and S52 shown in FIG. 5. Alternatively, the processor implements, when executing the computer program, the functions of various modules/units in the various device embodiments described above, such as a management frame receiving module.

Exemplarily, the computer program may be divided into one or more modules/units, which are stored in the memory and executed by the processor to accomplish the present invention. The one or more modules/units may be a series of computer program instruction segments capable of performing specific functions, and the instruction segments are used to describe the execution process of the computer program in the method for determining the contention window.

Those skilled in the art can understand that the schematic diagram is only an example of the station device, and does not constitute a limitation on the station device, and the station device may include more or fewer components than those shown in the figure, or combine some components, or different components.

The processor 71 may be a Microcontroller Unit (MCU) Central Processing Unit (CPU), or may be other general-purpose processors, Digital Signal Processor (DSP), Application Specific Integrated Circuit (ASIC), Field-Programmable Gate Array (FPGA) or other programmable logic devices, discrete gate or transistor logic device, discrete hardware component, etc. The general-purpose processor may be a microprocessor or the processor may be any conventional processor, etc. The processor 71 is the control center of the method for determining the contention window which connects various parts of the whole method for determining the contention window by various interfaces and lines.

The memory 75 may be used to store computer programs and/or modules, and the processor 71 implements various functions of the method for determining the contention window by running or executing the computer programs and/or modules stored in the memory and invoking data stored in the memory. The memory 75 may mainly include a storage program area and a storage data area, where the storage program area may store an operating system, applications required by at least one function (such as sound playing function, image playing function, etc.) and so on; and the storage data area may store data created according to the use of a mobile phone (such as audio data, phone book, etc.). In addition, the memory 75 may include a high-speed random-access memory, and may also include a nonvolatile memory (such as a hard disk, an internal memory, a plug-in hard disk), a Smart Media Card (SMC), a Secure Digital (SD) card, a Flash Card, at least one disk storage device, a flash device, or other volatile solid-state storage devices.

Among them, the integrated modules/units of the station may be stored in a computer readable storage medium if they are implemented in the form of software functional units and sold or used as an independent product. Based on this understanding, the present invention can realize all or part of the processes in the methods of the above embodiments by instructing related hardware through a computer program, where the computer program may be stored in a computer readable storage medium, and when executed by a processor, the computer program may realize the steps of various method embodiments described above. The computer program includes computer program code which may be in the form of source code, object code, executable file or some intermediate form. The computer readable medium may include any entity or device capable of carrying the computer program code, recording medium, USB disk, removable hard disk, magnetic disk, optical disc, computer memory, Read-Only Memory (ROM), Random Access Memory (RAM), electrical carrier signal, telecommunication signal, software distribution medium, etc.

It should be noted that the above-described device embodiments are only schematic in which the units described as separate components may or may not be physically separated, and the components displayed as units may or may not be physical units, that is, they may be located in one place or distributed over multiple network units. Some or all of the modules may be selected according to the actual needs to achieve the purpose of the embodiments. In addition, in the figures of the device embodiments provided by the present invention, the connection relationship between modules means that they have communication connection, which can be specifically realized as one or more communication buses or signal lines. People of ordinary skills in the art can understand and implement them without creative labor.

The above are the preferred embodiments of the present invention, and it should be pointed out that for those of ordinary skill in the art, several improvements and embellishments can be made without departing from the principle of the present invention, and these improvements and embellishments should also be regarded as being in the protection scope of the present invention.

What is claimed is:

1. A method for determining a contention window, which is performed at an access point and comprises:
   acquiring buffer status reports of one or more stations and resource unit allocation status of the access point; and
   determining contention window parameters of the contention window according to the buffer status reports and the resource unit allocation status,
   wherein the contention window parameters comprise:
      a maximum contention window value,
      a minimum contention window value, and
      a reserved field value, and
      wherein the reserved field value is configured to indicate that stations associated and not associated with the access point select, as a corresponding contention window value for initializing an OFDMA back-off (OBO) counter, one of:
      the maximum contention window value or
      the minimum contention window value of the contention window,
      wherein a value of the reserved field value indicates that the stations associated or not associated with the access point select the maximum contention window value as the corresponding contention window value; and
      wherein another value of the reserved field value indicates that the stations associated or not associated with the access point select the minimum contention window value as the corresponding contention window value.

2. The method of claim 1, wherein acquiring the buffer status reports of the one or more stations comprises acquiring, through a buffer status report BSR mechanism, the buffer status reports of one or more stations that have been associated with the access point and are in an active status, and the buffer status reports of each station indicate whether the station has a buffered data transmission demand.

3. The method of claim 1, wherein determining the contention window parameters of the contention window according to the buffer status reports and the resource unit allocation status further comprises:
   based on predetermined rules, allocating resource units to stations that have buffered data transmission demands;
   determining whether there are remaining resource units of the access point in a case where the access point has determined that it allocates resource units to all the stations that have buffered data transmission demands;
   in response to having remaining resource units, setting the minimum contention window value of the contention window to a lower limit value required by a communication protocol, setting the maximum contention window value of the contention window to an upper limit value required by the communication protocol, and setting the reserved field value of the contention window to a value, which is for indicating that an associated station selects the maximum contention window value and an unassociated station selects the minimum contention window value;
   in response to having no remaining resource units, setting the minimum contention window value of the contention window to the lower limit value required by the communication protocol, and setting the reserved field value of the contention window to a value, which is for indicating that all stations select the minimum contention window value.

4. The method of claim 1, wherein determining the contention window parameters of the contention window according to the buffer status reports and the resource unit allocation status further comprises:
   based on predetermined rules, allocating resource units to stations that have buffered data transmission demands;
   determining whether there are remaining resource units of the access point in a case where the access point determines not to allocate the resource units to all the stations that have buffered data transmission demands;
   in response to having remaining resource units, setting the minimum contention window value of the contention window to a specified window value, setting the maximum contention window value of the contention window to an upper limit required by a communication protocol, and setting the reserved field of the contention window to a value, which is for indicating that an associated station selects the minimum contention window value and an unassociated station selects the maximum contention window value;
   in response to having no remaining resource units, setting the maximum contention window value of the contention window to an upper limit value required by the communication protocol, and setting the reserved field value of the contention window to a value, which is for indicating that all stations select the maximum contention window value.

5. The method of claim 4, wherein the specified window value is calculated from the number of stations that have been associated but have not been allocated resource units and the number of the remaining resource units.

6. The method of claim 5, wherein calculating the specified window value from the number of the stations that have been associated but have not been allocated resource units and the number of the remaining resource units comprises:
  calculating the specified window value by using a binomial distribution probability model based on a preset expected probability that no resource contention occurs, wherein the binomial distribution probability model is:

$$p = C(x,y) * p_1^{y} * (1-p_1)^{(x-y)}$$

wherein p represents the expected probability, x represents the number of the stations that have been associated but have not been allocated resource units, y represents the number of the remaining resource units, C(x,y) represents combinatorial number for taking y elements from x different elements, $$p_1 = \frac{y}{OCW_{shcd}},$$

and $OCW_{shcd}$ represents the specified window value.

7. An access point, comprising:
  a memory, and
  a processor communicatively coupled with the memory and configured to:
  acquire buffer status reports of one or more stations and resource unit allocation status of the access point; and
  determine contention window parameters of the contention window according to the buffer status reports and the resource unit allocation status,
  wherein the contention window parameters comprise a maximum contention window value, a minimum contention window value and a reserved field value, and wherein the reserved field value is configured to indicate that stations associated and not associated with the access point select, as a corresponding contention window value for initializing an OFDMA back-off (OBO) counter, one of the maximum contention window value or the minimum contention window value of the contention window,
  wherein a value of the reserved field value indicates that the stations associated or not associated with the access point select the maximum contention window value as the corresponding contention window value, and
  wherein another value of the reserved field value indicates that the stations associated or not associated with the access point select the minimum contention window value as the corresponding contention window value.

8. The access point of claim 7, wherein acquiring the buffer status reports of the one or more stations comprises acquiring, through a buffer status report BSR mechanism, the buffer status reports of one or more stations that have been associated with the access point and are in an active status, and the buffer status reports of each station indicate whether the station has a buffered data transmission demand.

9. The access point of claim 7, wherein determining the contention window parameters of the contention window according to the buffer status reports and the resource unit allocation status further comprises:
  based on predetermined rules, allocating resource units to stations that have buffered data transmission demands;
  determining whether there are remaining resource units of the access point in a case where the access point has determined that it allocates resource units to all the stations that have buffered data transmission demands;
  in response to having remaining resource units, setting the minimum contention window value of the contention window to a lower limit value required by a communication protocol, setting the maximum contention window value of the contention window to an upper limit value required by the communication protocol, and setting the reserved field value of the contention window to a value, which is for indicating that an associated station selects the maximum contention window value and an unassociated station selects the minimum contention window value;
  in response to having no remaining resource units, setting the minimum contention window value of the contention window to the lower limit value required by the communication protocol, and setting the reserved field value of the contention window to a value, which is for indicating that all stations select the minimum contention window value.

10. The access point of claim 7, wherein determining the contention window parameters of the contention window according to the buffer status reports and the resource unit allocation status further comprises:
  based on predetermined rules, allocating resource units to stations that have buffered data transmission demands;
  determining whether there are remaining resource units of the access point in a case where the access point determines not to allocate the resource units to all the stations that have buffered data transmission demands;
  in response to having remaining resource units, setting the minimum contention window value of the contention window to a specified window value, setting the maximum contention window value of the contention window to an upper limit required by a communication protocol, and setting the reserved field of the contention window to a value, which is for indicating that an associated station selects the minimum contention window value and an unassociated station selects the maximum contention window value;
  in response to having no remaining resource units, setting the maximum contention window value of the contention window to an upper limit value required by the communication protocol, and setting the reserved field value of the contention window to a value, which is for indicating that all stations select the maximum contention window value.

11. The access point of claim 10, wherein the specified window value is calculated from the number of stations that have been associated but have not been allocated resource units and the number of the remaining resource units.

12. The access point of claim 11, wherein calculating the specified window value from the number of the stations that have been associated but have not been allocated resource units and the number of the remaining resource units comprises:
  calculating the specified window value by using a binomial distribution probability model based on a preset expected probability that no resource contention occurs,
  wherein the binomial distribution probability model is:

$$p = C(x,y) * p_1^{y} * (1-p_1)^{(x-y)}$$

wherein p represents the expected probability, x represents the number of the stations that have been associated but have not been allocated resource units, y represents the number of the remaining resource units, C(x,y) represents combinatorial number for taking y elements from x different elements, $$p_1 = \frac{y}{OCW_{shcd}},$$

and $OCW_{shcd}$ represents the specified window value.

13. A station, comprising:
a memory, and
a processor communicatively coupled to the memory and configured to:
receive, from an access point, a management frame comprising contention window parameters determined by the access point, wherein the contention window parameters comprise a maximum contention window value, a minimum contention window value, and a reserved field value, and wherein the reserved field value is configured to indicate that stations associated and not associated with the access point select, as a corresponding contention window value for initializing an OFDMA back-off (OBO) counter, one of the maximum contention window value or the minimum contention window value of the contention window; and
select the maximum contention window value or the minimum contention window value as the contention window value according to an association status of the station with the access point and the reserved field value, comprising:

selecting the maximum contention window value as the corresponding contention window value, in response to a value of the reserved field value; and selecting the minimum contention window value as the corresponding contention window value, in response to another value of the reserved field value.

14. The station of claim 13, wherein, in a case where the station has not been associated with the access point:
in response to the reserved field value being a first value or a fourth value, select the minimum contention window value; and
in response to the reserved field value being a second value or a third value, select the maximum contention window value.

15. The station of claim 13, wherein, in a case where the station has been associated with the access point:
in response to the reserved field value being a first value or a third value, select the minimum contention window value; and
in response to the reserved field value being a second value or a fourth value, select the maximum contention window value.

* * * * *